United States Patent
Dahl

(10) Patent No.: US 11,774,322 B2
(45) Date of Patent: Oct. 3, 2023

(54) OPTICAL MEASURING DEVICE AND METHOD FOR MEASURING AN OPTICAL ELEMENT

(71) Applicant: Möller-Wedel Optical GmbH, Wedel (DE)

(72) Inventor: Michael Dahl, Radbruch (DE)

(73) Assignee: Möller-Wedel Optical GmbH, Wedel (DE)

( * ) Notice: Subject to any disclaimer, the term of this patent is extended or adjusted under 35 U.S.C. 154(b) by 271 days.

(21) Appl. No.: 17/048,840

(22) PCT Filed: Apr. 16, 2019

(86) PCT No.: PCT/EP2019/059839
§ 371 (c)(1),
(2) Date: Oct. 19, 2020

(87) PCT Pub. No.: WO2019/201947
PCT Pub. Date: Oct. 24, 2019

(65) Prior Publication Data
US 2021/0239565 A1    Aug. 5, 2021

(30) Foreign Application Priority Data
Apr. 18, 2018 (DE) ..................... 20 2018 102 149.4

(51) Int. Cl.
*G01M 11/02* (2006.01)
*G01B 11/14* (2006.01)

(52) U.S. Cl.
CPC ......... *G01M 11/0264* (2013.01); *G01B 11/14* (2013.01); *G01M 11/0207* (2013.01); *G01M 11/0257* (2013.01)

(58) Field of Classification Search
CPC .... G01M 11/00; G01M 11/005; G01M 11/02; G01M 11/0207; G01M 11/0214;
(Continued)

(56) References Cited

U.S. PATENT DOCUMENTS 3,447,874 A * 6/1969 Back .................. G01M 11/0292
356/124.5
3,862,797 A * 1/1975 Uesugi .................. G03B 17/14
359/825
(Continued)

FOREIGN PATENT DOCUMENTS

DE 2543563 A1 3/1977
DE 3629648 A1 3/1988
(Continued)

OTHER PUBLICATIONS

International Search Report for International Application No. PCT/EP2019/059839 dated Jul. 8, 2019; 2 pgs.

*Primary Examiner* — Gordon J Stock, Jr.
(74) *Attorney, Agent, or Firm* — Alix, Yale & Ristas, LLP

(57) ABSTRACT

The present invention relates to a device for measuring an optical element comprising: a. a light source, b. a measurement structure which illuminated by the light of the light source and has areas of different transmissivity, c. an optical imaging system for converting light transmitted by the measurement structure into a collimated measuring beam which is directed onto the optical element, and d. a sensor for detecting a reflection of the measuring beam generated on the optical element for detecting a transmission of the measuring beam passing through the optical element. According to the invention the light source has a plurality of light segments, wherein the device further comprises a control unit which is designed for independently controlling the plurality of light segments. The invention further relates to a corresponding method for measuring an optical element. The device according to the invention and the method according to the invention can be used particularly flexibly due to the segmented light source.

17 Claims, 4 Drawing Sheets

(58) Field of Classification Search
CPC ......... G01M 11/0221; G01M 11/0228; G01M 11/0235; G01M 11/0242; G01M 11/025; G01M 11/0257; G01M 11/0264; G01M 11/0271; G01M 11/0278; G01M 11/0285; G01M 11/0292; G01B 11/14; G01B 11/24; G01B 11/25; G01B 11/26; G01N 2021/8825; G01N 2021/8835; G01N 2021/9583; G01N 21/8806; G01N 21/958
See application file for complete search history.

(56) References Cited

U.S. PATENT DOCUMENTS

| | | | | |
|---|---|---|---|---|
| 5,331,394 | A * | 7/1994 | Shalon | G01M 11/0235 356/127 |
| 5,661,816 | A * | 8/1997 | Fantone | G01M 11/0292 382/100 |
| 10,175,141 | B2 * | 1/2019 | Franz | G02B 27/30 |
| 10,302,421 | B2 | 5/2019 | Heist et al. | |
| 10,634,618 | B2 * | 4/2020 | Nikitin | G01N 21/958 |
| 2012/0268588 | A1 * | 10/2012 | Eckerl | G01M 11/0292 348/135 |
| 2015/0185459 | A1 * | 7/2015 | Clark | G02B 21/14 359/385 |
| 2016/0123892 | A1 * | 5/2016 | Cauwenberghs | G01N 21/8806 348/136 |

FOREIGN PATENT DOCUMENTS

| | | |
|---|---|---|
| DE | 102012025551 B3 | 12/2013 |
| DE | 102013001458 A1 | 7/2014 |
| DE | 102013002399 A1 | 8/2014 |
| DE | 102013013791 A1 | 3/2015 |
| DE | 102014002084 A1 | 4/2015 |
| JP | S5515120 A | 2/1980 |
| JP | H04070540 A | 3/1992 |
| WO | 2012037909 A2 | 3/2012 |

* cited by examiner

OPTICAL MEASURING DEVICE AND METHOD FOR MEASURING AN OPTICAL ELEMENT

BACKGROUND

The present invention relates to a device and to a method for measuring an optical element. The device comprises a light source, an imaging optical unit, a measurement structure and a sensor. The measurement structure is illuminated by the light of the light source and has regions of differing transmittance. The imaging optical unit is configured for converting light transmitted by the measurement structure into a collimated measurement beam that is directed onto the optical element. The sensor is configured for detecting a reflection of the measurement beam produced at the optical element or for detecting a transmission of the measurement beam passing through the optical element.

The prior art discloses directing such a measurement beam for example onto a plane surface of an optical element and subsequently detecting the reflection of the measurement beam at the plane surface using a sensor. An image of the measurement structure is likewise reflected at the plane surface and can be detected on the sensor in a simple manner. By way of example, the orientation of the plane surface can be determined on the basis of a determination of the position of the measurement structure on the sensor (see WO 2012 037 909, for example). A combination of a collimator and a telescope can be used for the measurement, wherein the measurement beam generated by the collimator is reflected at the optical element and is subsequently imaged onto the sensor by the telescope. Alternatively, an autocollimator can also be used, wherein the reflected measurement beam once again enters the autocollimator and passes to the sensor via a beam splitter.

What is disadvantageous about such measuring devices, however, is that the optical element examined must have a sufficiently large plane surface at which the measurement beam is reflected homogeneously in a defined direction. Local deviations of the direction of the reflected measurement beam which arise for example as a result of local defocusing, local shape deviations of the optical surface examined or other influencing factors cannot be measured, or at least cannot be measured with sufficient accuracy, using the known measuring devices. Optical surfaces having a shape deviating from a plane surface, for example curved or spherical surfaces, also often cannot be measured satisfactorily, or can be measured only with increased metrological complexity, using the known measuring device.

Taking this as a departure point, the object of the present invention is to provide a device for measuring an optical element which is usable more flexibly. This object is achieved by the features of the independent claims. Advantageous embodiments are described in the dependent claims.

SUMMARY OF THE INVENTION

According to the invention, the light source has a plurality of light segments, wherein the device furthermore has a control unit configured for independently controlling the plurality of light segments.

Firstly, some terms used in the context of the invention will be explained. A light segment of the light source denotes a part of the light source that emits light independently. Each segment of the light source is thus configured to emit light independently. As a result of the independent controllability of the segments, the light source can be switched such that only a single light segment or an arbitrarily selectable group of light segments emits light, while the other segments remain switched off, that is to say do not emit light. The respective segment or the group of segments can preferably be selected arbitrarily by the control unit. The light emitted by the single segment or the group of segments is directed in the direction of the optical element by the imaging optical unit.

The imaging optical unit is configured for generating a collimated measurement beam. This means that the measurement beam generated by the imaging optical unit is formed by a substantially parallel beam of light.

The imaging optical unit preferably has a condenser and a lens. The measurement structure is situated in a beam path of the imaging optical unit and is preferably arranged between the condenser and the lens. The measurement structure is preferably imaged into infinity by the imaging optical unit. The measurement structure can be configured as a reticle, for example, wherein regions with high transmittance are formed by crossing lines which are perpendicular to one another, for example. The other regions of the reticle can have a lower transmittance or be nontransmissive to the measurement beam. The light-transmissive regions of the measurement structure can also have any other shape which enables or simplifies a determination of the position of the reflected measurement beam on the sensor. A simple pinhole stop is not regarded as a measurement structure in the context of the invention.

The sensor usually has an extent in a plane perpendicular to the direction of incidence of the reflected measurement beam, wherein a spatially resolved detection of the reflection is possible on the sensor plane. By way of example, the sensor can be configured as a CCD sensor or as a CMOS sensor. The device can have an evaluation unit configured for evaluating the measurement signals detected by the sensor.

In the context of the invention, the "optical element" is configured to at least partly reflect and/or at least partly transmit the measurement beam, such that the reflection and/or the transmission of the measurement beam can be detected by the sensor. The term "transmission of the measurement beam" denotes a portion of the light of the measurement beam which passes through the optical element. The optical element can have arbitrary shapes; in particular, it is not necessary for the optical element to have a plane surface.

The area of application of the measuring device is significantly extended by the independently controllable light segments. Firstly, the device according to the invention, as described above, can fulfil the customary tasks of an autocollimator or a combination of collimator and telescope, wherein in this case for example all or at least a large portion of the light segments can be controlled for emitting light in order to generate a measurement beam that is directed onto the optical element.

In addition, the device according to the invention makes it possible to control just a single light segment, for example, such that via the imaging optical unit only a relatively small part of the measurement beam impinges on the optical element to be measured and is reflected or transmitted there. As a result, it becomes possible to scan only a small part of the optical element to be measured. In the context of the invention it has been recognized that this relatively small part of the measurement beam, owing to the simultaneous use of the measurement structure, is sufficient for obtaining meaningful information about the optical element to be measured. In particular, in this way it is possible to carry out a spatially resolved measurement enabling information about the local direction of the reflection at the optical element or about the wavefront transmitted by the component to be obtained with high accuracy. Such a measurement can be repeated for each individual one of the light segments. Moreover, provision can also be made for an arbitrarily selectable group of light segments to be used simultaneously for illumination. By means of the device according to the invention, in this way spatially resolved information about the direction of the reflection at the optical element to be measured can be obtained with high accuracy in conjunction with a scaleable resolution. From the information about the local directions of the reflection, the surface shape of the optical surface to be measured can then be calculated on the basis of known mathematical methods with the aid of the evaluation unit, for example. In the case where the transmitted measurement beam is detected, the wavefront deformation of the measurement beam that is produced by the component can be determined and, for example, a spatially resolved determination of the transmission properties of the optical element can be effected in this way.

As explained above, the imaging optical unit for generating the measurement beam can have a condenser and a lens. The condenser is preferably configured for imaging the light source into an entrance pupil of the lens. Lens and condenser can each be formed by a single lens element or by a system of lens elements. The light source is preferably arranged in the object plane of the condenser. The image plane of the condenser preferably corresponds to the entrance pupil of the lens. A so-called interlaced beam path arises in this way. The light of the segmented light source is utilized optimally in this way in order that the measurement beam formed from a parallel beam of light is generated therefrom. If only a single light segment is switched on, a parallel partial beam is generated by means of the above-described configuration between the imaging optical unit (or between the last lens element of the lens) and the optical element to be measured, said partial beam being incident only on a relatively small section of the optical element and being detected by the sensor after reflection. In order then to determine the direction of the reflection and/or transmission of a partial beam, the position of the imaging of the measurement structure on the sensor is detected. For this purpose, preferably both the sensor and the measurement structure are situated in the focal plane of the lens.

The light segments are preferably arranged offset with respect to one another in a transverse direction (that is to say perpendicular to the optical axis). As a result, different segments generate partial beams of the measurement beam that are offset with respect to one another in a transverse direction. The optical axis of the imaging optical unit can extend through the center of the light source. In one preferred embodiment, at least one portion of the light segments is arranged in a plane, wherein the plane preferably forms an angle with an optical axis of the imaging optical unit, which angle is preferably substantially 90°. The plane preferably corresponds to the object plane of the condenser. By virtue of such an arrangement, the segments are imaged uniformly into the entrance pupil of the lens and can contribute uniformly to the formation of the measurement beam.

The light segments can form a regular grid. In this context, the term "grid" means that the respective segments have a regular arrangement relative to one another. The regularity can exist both along a first spatial direction and along a second spatial direction, which is different than the first spatial direction. The light segments can be at uniform distances. The distances between two segments along the first spatial direction can correspond to the distances between the segments along the second spatial direction. The two spatial directions can be perpendicular to one another, such that a rectangular grid is formed in this case.

In one advantageous embodiment, the light source is circular, wherein the segments divide the circle into e.g. quarters or halves. It is also possible for the segments to form a "circular grid". This means that a central segment is surrounded by further segments in a ring-shaped fashion (that is to say at in each case substantially the same distance from the central segment). One or more further rings of light segments can be arranged around the segments arranged in a ring-shaped fashion, wherein the diameters of the rings increase toward the outside. The central segment can be arranged on the optical axis.

The regular arrangement of the segments enables an optical element that is to be measured to be optically scanned systematically, with the result that meaningful information about the surface of the element or the wavefront deformation produced by the optical element can be obtained.

A light segment can be formed by a light emitting diode. In particular, the light emitting diodes can be formed by organic light emitting diodes (OLEDs). With the aid of LEDs or OLEDs, it is possible to form substantially punctiform light segments with a directional emission characteristic, wherein a high luminous intensity can simultaneously be realized. In one preferred embodiment, a light segment is formed by an exit end of an optical waveguide. In a further preferred embodiment, a light segment can have a micromirror of a DLP chip (Digital Micromirror Device).

In a transverse direction (that is to say perpendicular to the optical axis), the light segments preferably have a dimension that is smaller than 2 mm, preferably smaller than 1 mm, more preferably smaller than 0.5 mm. In the case of a configuration as micromirrors, the dimension can be significantly smaller still, for example smaller than 5 μm. The dimension mentioned relates in each case to the light emitting surface of a light segment. The light emitting surface of the light segments can have an arbitrary shape, in principle; preferably, however, the shape is circular, elliptic, rectangular or square. Preferably, the number of light segments of a light source is at least 2, with further preference at least 4, with even further preference at least 8. The number of light segments can also be significantly higher than 8. By way of example, with the use of micromirrors, a number of more than 100 000 or 1 000 000 light segments can be provided. The smaller the dimensions of the light segments and the more light segments the light source has, the better the spatial resolution that is achievable.

Provision can furthermore be made for the light segments to be configured for emitting light having a first wavelength and at least one second wavelength different than the first wavelength. The control unit is preferably configured to control the light segments in order to switch over between the first wavelength and at least the second wavelength. It is also possible for a first light segment to be configured for emitting light having the first wavelength and for a second light segment to be configured for emitting light having the second wavelength. The emission of "light having a wavelength" means that the emitted light originates from a narrow spectral partial range. Since optical elements, with regard to different wavelengths, have a different reflection and transmission behavior under certain circumstances, this configuration makes it possible to obtain additional information.

Provision can be made for the device according to the invention to have a collimator and a telescope, wherein the light source and the imaging optical unit are part of the collimator and wherein the sensor is arranged in the image plane of the telescope. In one preferred embodiment, the device according to the invention is configured as an autocollimator, wherein the sensor is arranged in an image plane of the imaging optical unit. A beam splitter is preferably arranged in the beam path of the imaging optical unit, such that it is situated in the beam path between the condenser and the lens and also between the sensor and the lens.

In one advantageous embodiment, the measurement structure is configured such that it is displaceable relative to the imaging optical unit. Preferably, the measurement structure is configured such that it is displaceable along the optical axis. By virtue of this configuration, the measurement structure can be moved in particular out of a focal plane of the imaging optical unit, such that the imaging optical unit can thereby be focused at a finite distance. Depending on the displacement direction, a real or virtual image of the measurement structure arises at a desired distance (which is dependent on the extent of the displacement) from the imaging optical unit. The displaceability of the measurement structure enables further possibilities for application of the present invention, which are explained in even greater detail below. If the device in this embodiment, that is to say with a displaceable measurement structure, is additionally designed as an autocollimator, then the device can also be referred to as a focusable autocollimator. In the case of a displaceable measurement structure, too, the measurement beam generated by the imaging optical unit is thus still regarded in the present case as a collimated measurement beam, that is to say as a substantially parallel beam of light.

Preferably, the device comprises a mirror arranged behind the optical element. Alternatively, the device comprises a retroreflector arranged behind the optical element. These configurations can be employed, in particular, if the device is configured as an autocollimator and the optical element is measured in transmission. With the aid of the mirror or retroreflector, it is possible to measure optical elements in transmission without a telescope having to be arranged behind the optical element. Rather, transmitted light beams can be reflected at the mirror or retroreflector in order to reach the sensor in the opposite direction via the optical element and the imaging optical unit. The mirror or retroreflector thus makes it possible to measure transmissive optical elements by means of autocollimation.

The invention additionally relates to a method for measuring an optical element using a device according to the invention described above, comprising the following steps:

a. controlling a first light segment, such that light emitted by the first light segment passes through the measurement structure and is converted into a measurement beam by means of the imaging optical unit, which measurement beam is directed onto the optical element;

b. detecting a reflection or transmission of the measurement beam obtained in accordance with step a., said reflection or transmission being produced at the optical element;

c. controlling a second light segment, which is different than the first light segment, such that light emitted by the second light segment passes through the measurement structure and is converted into a measurement beam by means of the imaging optical unit, which measurement beam is directed onto the optical element;

d. detecting a reflection or transmission of the measurement beam obtained in accordance with step c., said reflection or transmission being produced at the optical element.

Controlling the light segments in accordance with steps a. and c. can be effected successively or else simultaneously. The same correspondingly applies to detecting the reflections in accordance with steps b. and d. Moreover, at the same time as controlling the first and second light segments or else with a temporal offset with respect thereto, a further light segment or groups of light segments can be controlled and the corresponding reflections can be detected.

The method according to the invention can be developed by further features that have already been described above in connection with the device according to the invention.

In one preferred embodiment, the measurement beam generated in accordance with steps a. and c. is collimated. In one preferred embodiment, the optical element to be measured can be a camera lens arranged such that light emitted by the light source passes through the camera lens and is subsequently detected by the sensor. Preferably, an imaging aberration of the camera lens, for example a defocusing and/or an astigmatism and/or a coma of the camera lens, is determined by means of the transmitted measurement beams detected in accordance with steps b. and d. In this case, a mirror, which is preferably displaceable along the optical axis, can be arranged behind the camera lens, such that light that has passed through the camera lens passes through the camera lens in the opposite direction after reflection at the mirror and is subsequently detected by the sensor. With the aid of the detection of the measurement beams generated by different light segments, imaging aberrations of the camera lens can be determined. If a retroreflector is used instead of the mirror, the imaging aberrations of the lens can be determined in a particularly simple manner since the mathematical reconstruction of the wavefront is simplified when a retroreflector is used.

In one preferred embodiment, the measurement structure is configured such that it is displaceable relative to the imaging optical unit and preferably displaceable along the optical axis of the imaging optical unit. With further preference, the measurement structure is displaced before the process of controlling a light segment and the process of detecting a reflection or transmission of the measurement beam, said reflection or transmission being produced at the optical element, in order to adapt a position of a virtual or real image of the measurement structure to an optical property of the optical element to be measured. As already explained above, the displacement of the measurement structure enables a virtual or real image of the measurement structure to be generated, wherein the position of the image of the measurement structure is dependent on the displacement of the measurement structure. In particular, the displacement of the measurement structure can be used to adapt the position of the image of the measurement structure to a distance setting of the camera lens to be measured. If the mirror is configured such that it is displaceable, alternatively or additionally provision can also be made for the position of the mirror to be adapted to the flange focal length of the camera lens. Finally, alternatively or additionally, converter optical units can also be inserted into the beam path, which result in an adaptation to the specific properties of the camera lens such as, for example, a particular focus setting, aperture or a particular wavefront shape.

The invention furthermore relates to the use of the device according to the invention for measuring a spatial displacement of an object. In the case of the use according to the invention, the object to be measured is configured to at least partly specularly or diffusely reflect a measurement beam of the device according to the invention. The measurement beam is focused by means of a measurement lens in the vicinity of the object, wherein the following steps are subsequently carried out:

a. controlling a first light segment for generating a measurement beam;

b. detecting a reflection of the measurement beam obtained in accordance with step a., said reflection being produced at the object;

c. controlling a second light segment (18), which is different than the first light segment, for generating a measurement beam;

d. detecting a reflection of the measurement beam obtained in accordance with step c., said reflection being produced at the object;

e. evaluating the reflections detected in accordance with steps b. and d. in order to determine a wavefront of the reflections that is caused by the position of the object;

f. calculating the position on the basis of the wavefront determined in step e.

The use according to the invention can be developed by further features that have been described above in connection with the device according to the invention or with the method according to the invention. The use according to the invention makes it possible to measure very precisely the position of an object relative to the focal position of the measurement lens. In contrast to other methods known from the prior art for determining an object position relative to the focus (for example by means of a modulation transfer function), with the aid of the method according to the invention it is possible to calculate the position of the object relative to the focus of the measurement lens without iteration or displacement of the object on the basis of the wavefront of the measurement lens. A method for determining the wavefront on the basis of reflections generated at an object and also for evaluating the reflections in order to determine a position of the object is known in principle from the prior art and is used in connection with customary wavefront sensors or Shack-Hartmann sensors. The sub-method of evaluation and calculation in accordance with steps e. and f. therefore need not be explained in detail in the present case.

BRIEF DESCRIPTION OF THE DRAWINGS

One advantageous embodiment of the present invention is explained by way of example below with reference to the accompanying drawings, in which.

DETAILED DESCRIPTION

Figure 1:
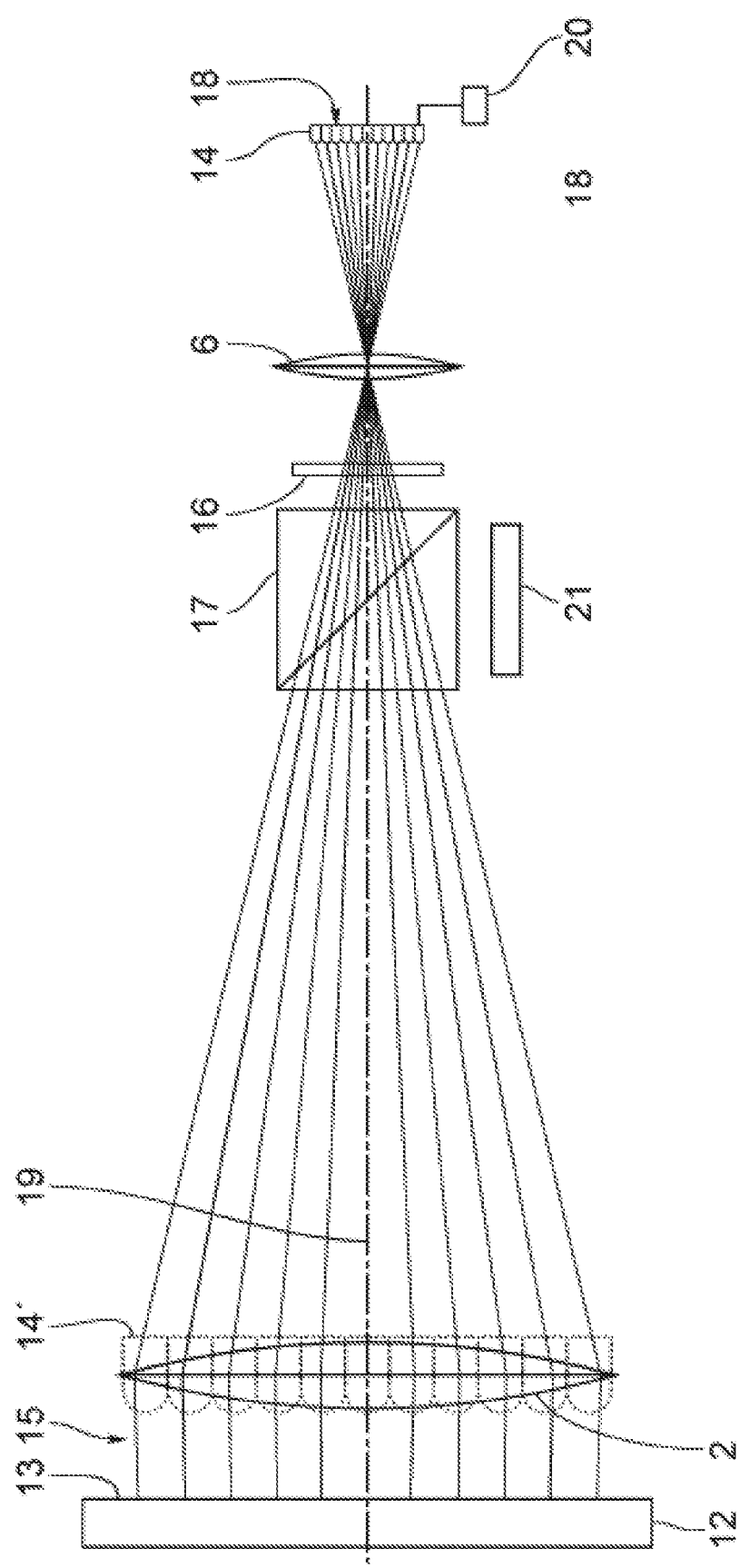
FIG. 1: shows a schematic view of one embodiment of the device according to the invention for measuring an optical component in a first operating mode.

FIG. 1 shows a device according to the invention for measuring an optical element 12 in a schematic view. The optical element 12 has a plane surface 13, which at least partly reflects incident light. The optical element 12 is arranged on a sample holder (not shown in the figure), such that the surface 13 is oriented substantially perpendicular to an optical axis 19 of the device. The direction of the reflection is substantially 180°. The device has a light source 14 and an imaging optical unit. The imaging optical unit generates a substantially parallel beam 15 of rays from the light emitted by the light source 14. For this purpose, the imaging optical unit comprises a condenser lens element 6, in the object plane of which the light source 14 is arranged, and also a lens 2. The image plane of the condenser lens element 6 substantially corresponds to the entrance pupil of the lens 2. The image 14' of the light source that is generated by the condenser lens element 6 is indicated in a dashed manner in FIG. 1.

In the vicinity of the condenser lens element 6 and between condenser lens element 6 and lens 2, a reticle 16 is inserted into the beam path. The reticle 16 is situated in the object plane of the lens 2, such that crosshairs situated thereon are imaged into infinity. Furthermore, a beam splitter 17 is arranged in the beam path between reticle 16 and lens 2 and partly transmits incident light and partly reflects it at an angle of 90°.

The light source 14 has a plurality of light segments 18 arranged in a regular square grid. Eleven light segments 18 arranged next to one another in a radial direction are visible in FIG. 1. Ten further corresponding series of light segments 18 are situated along the extent perpendicular to the plane of the drawing, with the result that a total of 121 light segments are present. The dimensions of the light segments in a radial direction are approximately 0.1 mm×0.1 mm. The light segments 18 thus form a total area of approximately 1.21 mm². The light segments are arranged in a plane oriented at an angle of 90° with respect to the optical axis. The plane corresponds to the object plane of the condenser lens element 6.

Each light segment 18 is formed by a light emitting diode (LED). The light source is connected to a control unit 20. Each light segment 18 is individually controllable by the control unit 20. That is to say that an arbitrary light segment 18 or an arbitrary group of light segments 18 can be switched on for emitting light, while the other light segments 18 remain switched off and do not emit light.

In the operating state shown in FIG. 1, all the light segments 14 are switched on. For the sake of clarity, only one light ray is depicted proceeding from each of the light segments 18. The light emitted by the light segments 18 passes through the condenser lens element 6, the reticle 16 and the beam splitter 17 and is converted into a substantially parallel beam 15 of rays by the lens, as already described above. The beam 15 of rays is substantially reflected back on itself at the surface 13 to be measured and passes via the beam splitter 17 to a sensor 21 arranged in the image plane of the lens 2. In this way, the image of the reticle 16 is detected on the sensor 21. The orientation of the surface 13 can be determined from the position of the crosshairs formed by the image of the reticle 16 on the sensor 21. For this purpose, a reference measurement may previously have been carried out at an ideal optical surface in a known orientation in order to compare the position of the reflection of the surface 13 with that of the reference measurement.

Figure 2:
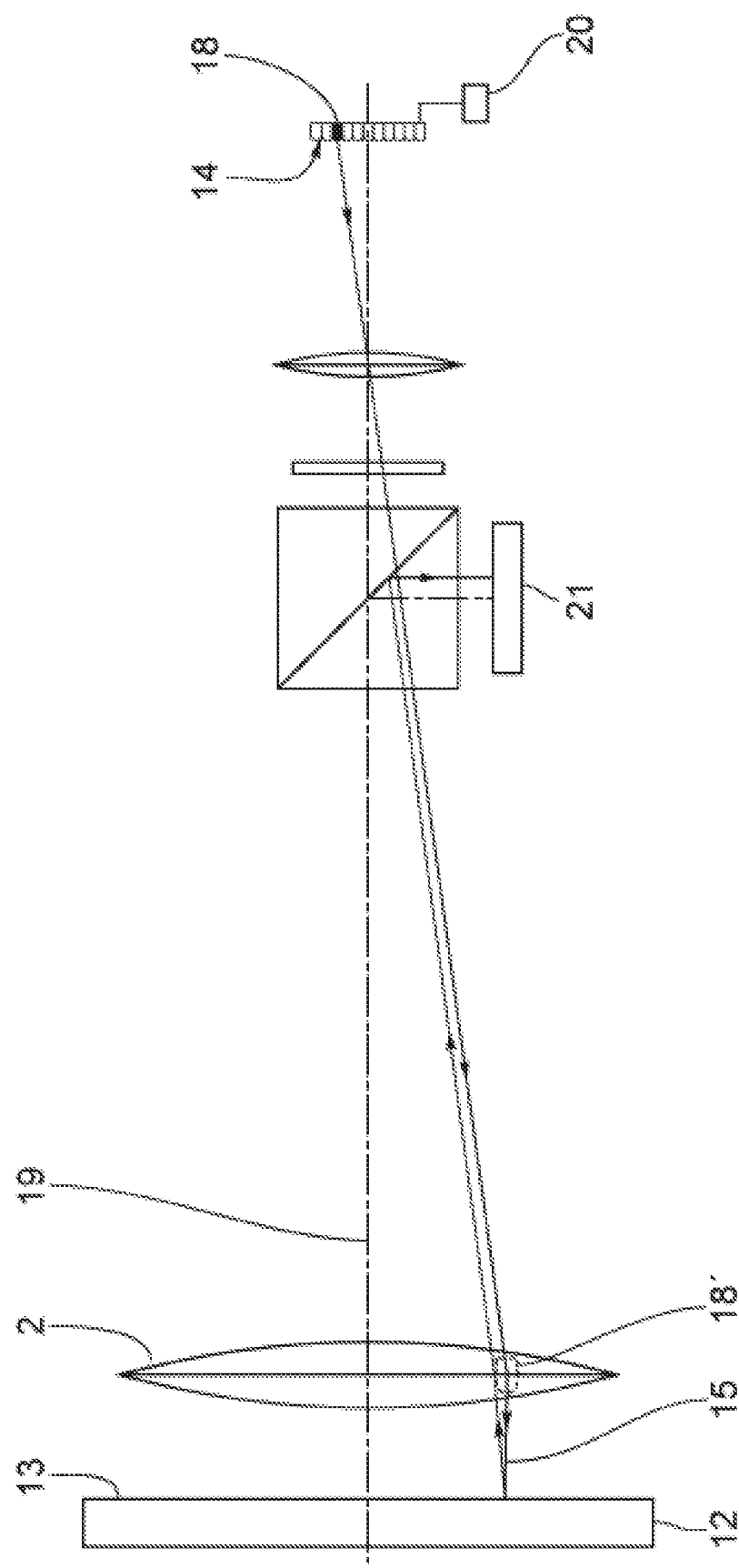
FIG. 2: shows a schematic view of the embodiment from FIG. 1 in a second operating mode.

FIG. 2 shows the device according to the invention in a second operating state. In this operating state, just a single light segment 18 is switched on, while the other light segments are switched off. The switched-on light segment 18 is identified by dark shading in FIG. 1. In the region of the entrance pupil of the lens 2, an image of the switched-on light segment 18 is generated in the region 18' indicated in a dashed manner. The lens 2 generates a partial beam 15' from the light of the light segment 18, said partial beam constituting only a small segment from the beam 15 of rays shown in FIG. 1. Accordingly, a significantly smaller section of the surface 13 to be measured is illuminated. After reflection at the surface 13, the partial beam 15', analogously to the procedure described above in connection with FIG. 1, passes to the sensor 21 and the position of the reflection (or of the crosshairs) is detected by the sensor. By virtue of the fact that only a small section of the surface 13 to be measured is illuminated, it is possible to examine the local direction of the reflection at the surface 13 in the illuminated region. Such a measurement can be carried out for each further light segment from among the light segments or else for a plurality of light segments switched on simultaneously, in order to scan the surface 13 to be examined in a spatially resolved manner and thus to obtain accurate information about the local shaping of the surface 13.

Figure 3:
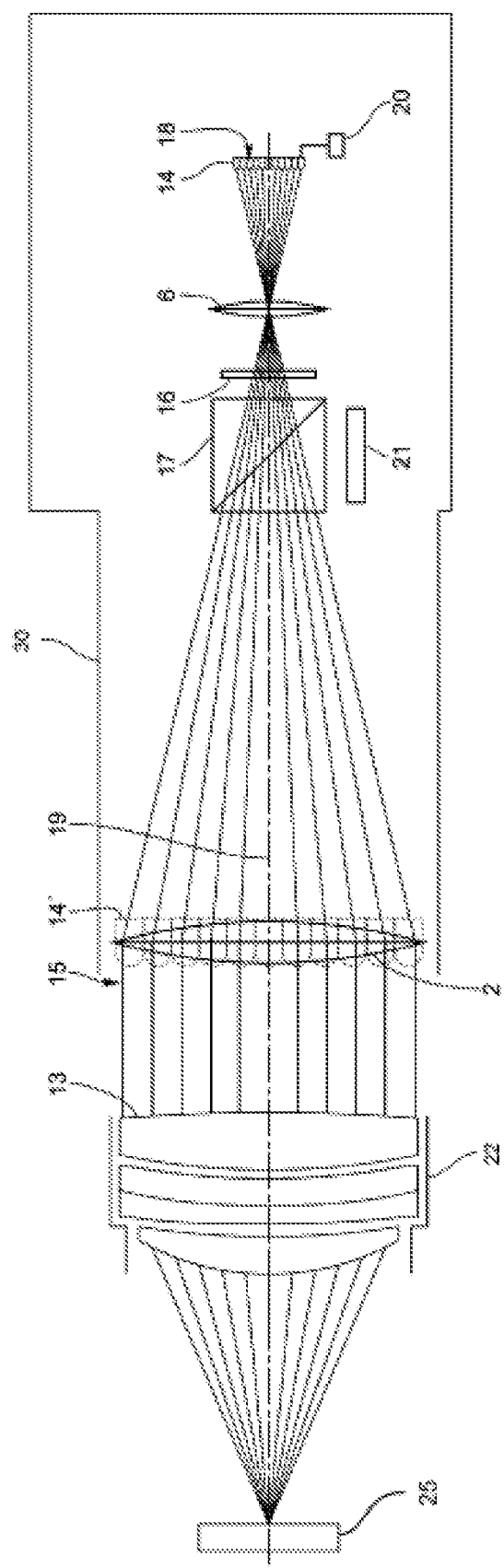
FIG. 3: shows a schematic view of a further embodiment of the device according to the invention, which is used for measuring a camera lens.

FIG. 3 shows a schematic view of a further embodiment of a device according to the invention, wherein the optical element to be measured by the device is a camera lens 22 in the present case. The embodiment in FIG. 3 substantially corresponds to the embodiment in FIGS. 1 and 2, wherein the elements of the device in FIG. 3 are arranged in a housing 30 and the camera lens 22 is positioned in front of the housing 30 at a defined distance from the lens 2. A further difference is that a plane mirror 25 is arranged behind the camera lens 22 to be measured. The camera lens 22 comprises a plurality of lens elements in the present case, but can in principle also be formed by just a single lens element. The beam 15 of rays enters via a surface 13 of the first lens element and exits again via a surface of the last lens element. The plane mirror arranged behind the camera lens 22 reflects the transmitted measurement beam, which subsequently passes in the opposite direction back through the camera lens 22 and the imaging optical unit of the device according to the invention in order subsequently to be detected on the sensor 21 in an analogous manner to the procedure already described above. The camera lens 22 is thus measured in transmission. The device according to the invention can be used, in particular, to measure for example a specific distance setting of the camera lens 22 or else imaging aberrations of the camera lens 22. This is explained in more specific detail below in connection with FIG. 4.

Figure 4:
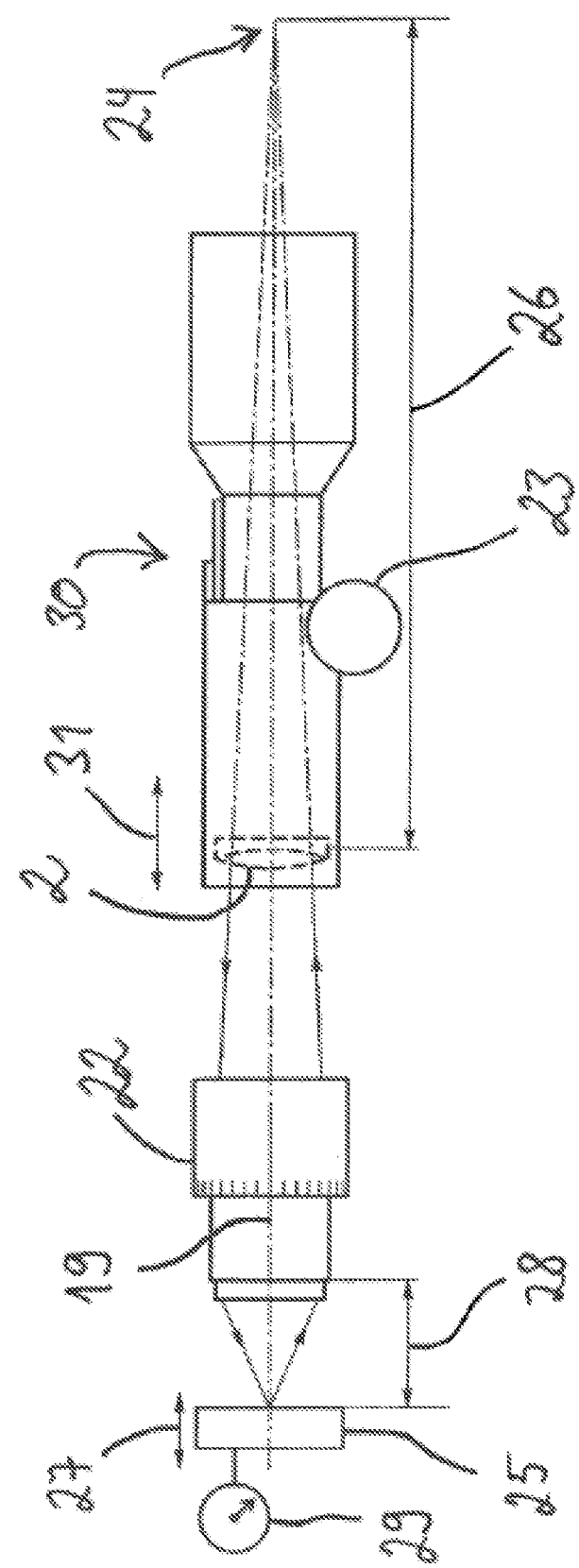
FIG. 4: shows a schematic view of a further embodiment of the device according to the invention, which is used for measuring a camera lens.

FIG. 4 illustrates the use of the device according to the invention for measuring a camera lens 22. A distance setting of the camera lens can be checked with the aid of the device according to the invention. If the camera lens has a plurality of variable distance settings, it is also possible for a plurality of distance settings to be checked successively. Checking a distance setting involves determining whether for a specific distance setting in the image plane of the camera lens (in which image plane for example the film or the sensor of a camera is situated when the camera lens is placed onto the camera) the camera lens generates a plane wavefront and thus supplies a sharp image.

In the present case, the device according to the invention has a housing 30, into which the elements described in connection with FIGS. 1 and 2 are integrated. These elements (apart from the lens 2) are therefore not illustrated again, for the sake of simplicity.

In the present case, the camera lens 22 to be measured is set to a distance setting of 3 m and is positioned at a distance of 0.1 m in front of the lens 2 of the device according to the invention. For accurate distance setting, the housing 30 can be mounted in a movable fashion (see arrow 31). The optical axis of the camera lens 22 is oriented along the optical axis 19 of the device. It is also conceivable for the optical axis of the lens to be tilted with respect to the axis of the device. In the jargon of the person skilled in the art this is measurement in the image plane. For this variant, the plane mirror 25 has to be replaced by a retroreflector.

In contrast to the device shown in FIGS. 1 to 3, within the device in FIG. 4, the measurement structure is configured such that it is displaceable along the optical axis 19, wherein a setting wheel 23 is present, with which the position of the measurement structure can be set precisely. As a result, it is possible to generate a virtual or real image of the measurement structure at a desired distance from the lens 2. In the present case, the position of the measurement structure is set such that a virtual image 24 of the measurement structure is generated at a distance of −2.9 m (see reference sign 26) from the lens 2.

A plane mirror 25 is arranged behind the camera lens 22 and is displaceable along the arrow 27, that is to say along the optical axis. The position of the plane mirror 25 is precisely determinable by means of a position determining device 29. The distance 28 between the bearing surface of the camera lens 22 and the plane mirror 25 is chosen such that it corresponds to the flange focal length of the camera lens 22.

A light beam emitted by the device is reflected at the mirror 25 after passing through the camera lens 22, in order subsequently to be detected by the sensor (not shown) in the opposite direction via the camera lens and the imaging optical unit. The virtual image 24 of the measurement structure appears at a distance of 3 m for the camera lens and should therefore be focused into the plane of the plane mirror 25 by the camera lens 22. If the camera lens has a setting error (that is to say a deviation from the setting to 3 m) or the flange focal length is not complied with, the image of the measurement structure is situated in each case in front of or behind the mirror. As a result, the image reflected back to the sensor is defocused. The defocusing can be ascertained in a particularly simple and precise manner with the aid of the controllability of the light segments according to the invention. For this purpose, for example, two light segments or groups of light segments which are oriented symmetrically with respect to the optical axis and are at a distance from the optical axis can be controlled simultaneously. With the aid of these symmetrically oriented light segments, it is possible to carry out a method for determining the focus error that is known in principle from the prior art, as is described for example in DE 2543563 A1. The extent of the defocusing can be determined for example with the aid of the displaceable measurement structure or with the aid of the displaceable plane mirror 25 if the focal length of the lens is not known. If the focal length of the lens is known, the extent and the sign of the defocusing can be determined from the measurement values of the method. In this case, the focusing in the virtual image plane (e.g. for the distance of 3.07 m) is always determinable from the measurement values. As a result, if the focal length is unknown, at least the sign of the defocusing in the image plane can be indicated.

With the aid of the invention, moreover, it is also possible to determine other imaging aberrations, for example an astigmatism and/or a coma of the camera lens, by determining the local wavefront deformation of the camera lens with the aid of the independently controllable light segments according to the invention.

A retroreflector can also be used instead of the plane mirror 25, in the case of which retroreflector incident measurement beams are reflected back on themselves. The mathematical reconstruction of the wavefront can be facilitated as a result. By way of example, the retroreflector used can be a spherical mirror that is arranged behind the optical element to be measured such that the incident measurement beams are reflected back on themselves. With the use of a retroreflector, it is also possible for the optical axis of the lens to be tilted with respect to the axis of the device and for a measurement in the image field to be able to be carried out as a result.

The invention claimed is:

1. A device for determining optical properties of an optical element in a spatially resolved manner using partial beams of a measurement beam, said device comprising:
   a) a light source having a plurality of light segments arranged offset with respect to one another in a transverse direction with respect to an optical axis of the device,
   b) a measurement structure having regions with differing transmittance, said measurement structure being illuminated by the light of the light source,
   c) an imaging optical unit for converting light transmitted by the measurement structure into a collimated measurement beam that is directed onto the optical element,
   d) a sensor for detecting a reflection of the measurement beam produced at the optical element or for detecting a transmission of the measurement beam passing through the optical element, and
   e) a control unit configured to independently control each of the plurality of light segments,
   wherein the plurality of light segments generate the partial beams of the measurement beam that are offset with respect to one another in the transverse direction.

2. The device of claim 1, wherein the measurement structure is displaceable relative to the imaging optical unit along an optical axis of the imaging optical unit.

3. The device of claim 1, wherein the imaging optical unit has a condenser and a lens, wherein the condenser is configured for imaging the light source into an entrance pupil of the lens.

4. The device of claim 1, wherein at least one portion of the light segments is arranged in a plane, wherein the plane forms an angle with an optical axis of the imaging optical unit of substantially 90°.

5. The device of claim 1, wherein at least one portion of the light segments form a regular grid, wherein the grid is circular or rectangular.

6. The device of claim 1, wherein an optical axis of the imaging optical unit extends through a center of the light source.

7. The device of claim 1, wherein a light segment is selected from the group consisting of an independently controllable light emitting diode, an independently controllable organic light emitting diode, an exit end of an optical waveguide, wherein the optical waveguide is fed by one or more LEDs, or a micromirror of a DLP chip.

8. The device of claim 1, wherein the light segments are configured for emitting light having a first wavelength and at least one second wavelength different than the first wavelength.

9. The device of claim 1, which has a collimator and a telescope, wherein the imaging optical unit is part of the collimator and wherein the sensor is arranged in the image plane of the telescope and the measurement structure is arranged in the image plane of the imaging optical unit.

10. The device of claim 1, which is configured as an autocollimator, wherein the sensor is arranged in an image plane of the imaging optical unit.

11. The device of claim 10, which furthermore has a mirror or retroreflector arranged behind the optical element.

12. The use of a device of claim 1 for measuring a spatial displacement of an object, wherein the object to be measured is configured to at least partly specularly or diffusely reflect a measurement beam emitted by the device, wherein the measurement beam is focused by means of a measurement lens in the vicinity of the object and wherein the following steps are subsequently carried out:
   a) controlling a first light segment for generating a measurement beam;
   b) detecting a reflection of the measurement beam obtained in accordance with step a), said reflection being produced at the object;
   c) controlling a second light segment, which is different than the first light segment, for generating a measurement beam;
   d) detecting a reflection of the measurement beam obtained in accordance with step c), said reflection being produced at the object;
   e) evaluating the reflections detected in accordance with steps b) and d) in order to determine a wavefront of the reflections that is caused by the position of the object;
   f) calculating the position on the basis of the wavefront determined in step e).

13. A method for measuring an optical element using the device of claim 1, comprising the following steps:
   a) controlling a first light segment, such that light emitted by the first light segment passes through the measurement structure and is converted into a first partial beam by means of the imaging optical unit, which first partial beam is directed onto the optical element;
   b) detecting a reflection or transmission of the first partial beam obtained in accordance with step a), said reflection or transmission being produced at the optical element;
   c) controlling a second light segment, which is different than the first light segment, such that light emitted by the second light segment passes through the measurement structure and is converted into a second partial beam by means of the imaging optical unit, which second partial beam is directed onto the optical element;
   d) detecting a reflection or transmission of the second partial beam obtained in accordance with step c), said reflection or transmission being produced at the optical element; and
   e) carrying out a spatially resolved determination of optical properties of the optical element on the basis of the first and second partial beams, wherein the first and second partial beams are offset with respect to one another.

14. The method of claim 13, wherein the measurement structure is displaceable relative to the imaging optical unit along the optical axis, wherein the measurement structure is displaced before the process of controlling a light segment and the process of detecting a reflection or transmission of the measurement beam, said reflection or transmission being produced at the optical element, in order to adapt a position of a virtual or real image of the measurement structure to an optical property of the optical element to be measured.

15. The method of claim 13, wherein the measurement beam generated in accordance with steps a) and c) is collimated.

16. The method of claim 13, wherein the optical element is a camera lens arranged such that light emitted by the light source passes through the camera lens and is subsequently detected by the sensor, wherein an imaging aberration of the camera lens including a defocusing or an astigmatism or a coma of the camera lens, is determined by means of the transmitted measurement beams detected in accordance with steps b) and d).

17. The method of claim 16, wherein a mirror, which is displaceable along the optical axis, is arranged behind the camera lens, such that light that has passed through the camera lens passes through the camera lens in the opposite direction after reflection at the mirror and is subsequently detected by the sensor.

* * * * *